United States Patent [19]

Cannavan

[11] Patent Number: 5,488,820
[45] Date of Patent: Feb. 6, 1996

[54] CANE HARVESTERS

[75] Inventor: Christopher J. Cannavan, Home Hill, Australia

[73] Assignee: Mainmeer Investments Pty. Ltd., Home Hill, Australia

[21] Appl. No.: 182,092

[22] PCT Filed: Jul. 14, 1992

[86] PCT No.: PCT/AU92/00347

§ 371 Date: Jan. 14, 1994

§ 102(e) Date: Jan. 14, 1994

[87] PCT Pub. No.: WO93/01707

PCT Pub. Date: Feb. 4, 1993

[30] Foreign Application Priority Data

Jul. 17, 1991 [AU] Australia .................................. PK7259

[51] Int. Cl.⁶ ............................................... A01D 45/10
[52] U.S. Cl. ............................................ 56/14.5; 56/504
[58] Field of Search .................................... 56/13.9, 14.3, 56/14.5, 156, 504, 505, 16.4 D

[56] References Cited

U.S. PATENT DOCUMENTS 3,103,091  9/1963  Duncan et al. ..................... 56/13.9
3,530,650  9/1970  Phillips ............................... 56/14.3 X
3,916,605  11/1975 Richards et al. ..................... 56/13.9 X
4,550,552  11/1985 Stiff ..................................... 56/13.9
4,584,824  4/1986  Hiyamuta ........................... 56/13.9

FOREIGN PATENT DOCUMENTS 34096  4/1973  Australia .
64711  7/1975  Australia .
50530  3/1980  Australia .

Primary Examiner—Stephen J. Novosad
Attorney, Agent, or Firm—Spensley Horn Jubas & Lubitz

[57] ABSTRACT

A billet severing apparatus for sugar cane harvesters comprises a conveyor (1) to feed cane longitudinally into a three bladed cutter (5) having cutter blades (7) axially mounted on a hub rotatable about an axis (6) transverse to the direction of feed of the cane stalks. The cutter blades (7) coact with a rotary anvil (11) which counter-rotates relative to the cutter (5). In addition to severing the cane stalks into billets, the rotary anvil (11) serves as a conveyor by throwing the severed billets vertically into a discharge chute (27). The rotary anvil (11) is located in a housing (25) with a close fitting peripheral wall surface extending about part of the swept volume of the anvil whereby a region of reduced air pressure created by rotation of the anvil (11) causes separation and discharge of cane trash through a port (26) in the lower part of the housing (25).

15 Claims, 3 Drawing Sheets

CANE HARVESTERS

This invention is concerned with an improved cane harvesting device and, in particular, to an improved cutting apparatus for cane harvesters.

In an endeavour to improve the cost efficiency of sugar cane harvesting, cane harvesting machines have rapidly evolved into quite sophisticated apparatus over the last decade or so.

A modern day cane harvester typically comprises a self propelled apparatus adapted to harvest both upright and laid over cane stalks, whether tangled or not. Such harvesters may include a topping cutter to remove the upper leafy portions of cane stalks and a base cutter to sever the cane stalks at or near ground level. The cane stalks are then fed by a conveyor means to cutting blades which sever the stalks into billets, typically from 200 mm to 250 mm in length. The billets are then transferred by a further conveyor to a storage bin associated with the harvester or directly into a transport vehicle which travels beside or behind the harvester as it carries out the harvesting operation.

Typical prior art cane harvesters of this type are illustrated in Australian Patent No. 480205, British Patent No. 1339816 and U.S. Pat. No. 3,599,404, 4,099,365 and 4,154,047.

Each of the prior art references incorporates a rotary cutting mechanism comprising contra-rotating blades synchronised to bring respective cutting edges together in a "pinching" action to sever the cane stalks into billets.

The major problem associated with "pinch" cutters is that as the cutting blades begin to wear, the "pinching" action is exacerbated and a clean sharp cutting action is no longer possible. After a relatively minor degree of wear on the cutting edges, incomplete severing of the cane stalks is likely to result.

Accordingly on prior art cane harvesting machines of the type employing contra-rotating cutting blades, considerable machine downtime is necessitated to resharpen and reset the cutting blades to minimise can juice losses in the severed billets.

With prior art harvesters of the type incorporating "pinching" cutter rollers the combined harvest losses due directly to the cutters and other factors can be as high as about 10% in some types of harvesters.

Australian Patent No. 525447 describes an alternative configuration of cane harvester in which the abovementioned prior art problems have been sought to be overcome. In this apparatus there is described a two bladed cutter contra-rotating in cooperation with a rotating anvil to obtain a "guillotine" like cut to sever the can stalks into billets. The rotating anvil serves also to act as a conveyer for the billets by throwing the billets upwardly into a curved chute.

Although the cane harvester, the subject of Australian Patent No. 525447, possessed a superior cutting apparatus in terms of minimising cane juice losses and machine downtime for blade sharpening and setting, the apparatus did suffer some losses of about 6–8% of the cane being harvested due to a degree of recirculation of the cane billets in the region of the cutters. This degree of waste is considered quite unacceptable in terms of the losses to cane growers.

In the apparatus of Australian Patent No. 525447, cane stalks are fed longitudinally into the cutting apparatus by opposed conveyor rollers via an opening in a housing in which the cutter blades rotate. Cane billets are severed in a "guillotine" like action when one of the two diametrically opposed cutting blades is aligned substantially perpendicularly with the cane stalks and a respective anvil face on the contra-rotating thrower which is synchronised to sweep the cane stalks against the perpendicular cutting blade. The cane billets with an attendant amount of "trash" in the form of leafy material are then propelled upwardly into a curved discharge chute into which is blown a downwardly directed air current which separates the trash from the billets and blows the trash out onto the ground surface via a trash exhaust port.

While the twin bladed cutter assembly rotates within a housing having front and back openings, the rotating anvil/thrower assembly rotates within the lower part of the billet discharge chute within the path of the trash separation air current.

An examination of the trash ejected from this apparatus shows a proportion of macerated cane stalks representing about 6–8% of the amount of cane fed through the harvester.

It has now been discovered that as the twin bladed cutting rotor rotates, it rotates between a cutting position and an intermediate position. In the former, the blades are in an upright position, generally perpendicular to the cane stalks being cut, effectively form a closure within the housing in which the cutting rotor rotates. As the blades rotate through 180° to the next cutting position, the blades pass through the intermediate position at about 90° of rotation, in which the plane of the opposed cutting blades is parallel to the cane stalks thus effectively creating an opening within the cutting rotor housing, which opening communicates between the feed inlet opening and the lower region of the outlet chute of the cut billets.

In this "open" position it is believed that the combined effects of the region of increased air pressure within the billet discharge chute together with an occasionally misaligned cane stalk, cause a proportion of trash and some billets to be propelled forwardly through the cutting rotor housing in a direction opposite that of the advancing cane stalks. The forwardly thrown billets and trash then advance again into the cutting assembly giving rise to multiple cutting and a degree of maceration of the cane. The finely chopped or macerated cane then entering the discharge chute is separated from the billets and blown out the trash exhaust port.

It is an aim of the present invention to overcome or ameliorate the problems of billet cutting mechanisms in prior art cane harvesters, to improve yields of cane harvested by harvesting machines, and otherwise to improve the energy efficiency of harvesting machines generally.

According to the invention, there is provided a billet severing apparatus for cane harvesting machines, said apparatus comprising:

feed conveyor means to feed harvested cane stalks longitudinally at predetermined rate to a severing region;

a housing for a rotary cutter with aligned inlet and outlet ports arranged transversely of the direction of feed of the cane stalks, said rotary cutter including at least three cutting blades extending longitudinally of a central cutter hub rotatable about said axis and spaced equally about said central cutter hub;

a rotatable thrower means adapted to counter-rotate relative to said rotary cutter about a substantially parallel rotational axis, said thrower means including a central thrower hub with at least two thrower blades extending longitudinally thereof and spaced evenly about said thrower hub, said thrower blades including anvil means extending along radially outer edges of said of said thrower blades, said cutting blades and said anvil means cooperating in use to sever cane stalks into billets of predetermined length.

Preferably said rotary cutter comprises three cutting blades.

If required the thrower means may include from two to six thrower blades.

Preferably the thrower means comprises two thrower blades.

Suitably the thrower blades are inclined relative to a plane extending radially from the thrower hub at the junction of the thrower hub and respective thrower blades.

If required the thrower means may include angular adjustment means to selectively vary the angle of inclination of the thrower blades relative to a respective plane extending radially from the thrower hub at the junction of the thrower hub and respective thrower blades.

Suitably the anvil means comprises a cutting edge extending along the radially outer edges of each thrower blade.

Preferably the anvil means comprises a hardened metal member.

If required the thrower blades may comprise an angularly adjustable anvil member.

Suitably the thrower is located within a thrower housing with a close fitting peripheral wall surface extending about at least part of the swept volume of the thrower.

Preferably the thrower housing and the thrower cooperate in use to create a region of reduced air pressure within the swept volume of the thrower.

The peripheral wall surface may extend from about 90° to 180° of the circular path swept by the thrower.

If required the apparatus may include a discharge chute for cut cane billets, said discharge chute being angularly adjustable about an upright axis and/or a transverse axis.

The discharge chute may include a deflection means to selectively control the direction of cane billets emerging from the discharge chute outlet port.

Suitably a hopper means is associated with the discharge chute to receive cane billets emerging therefrom.

In order that the invention may be more fully described, reference will now be made to a preferred embodiment of the invention described in the accompanying drawings in which.

Figure 1:
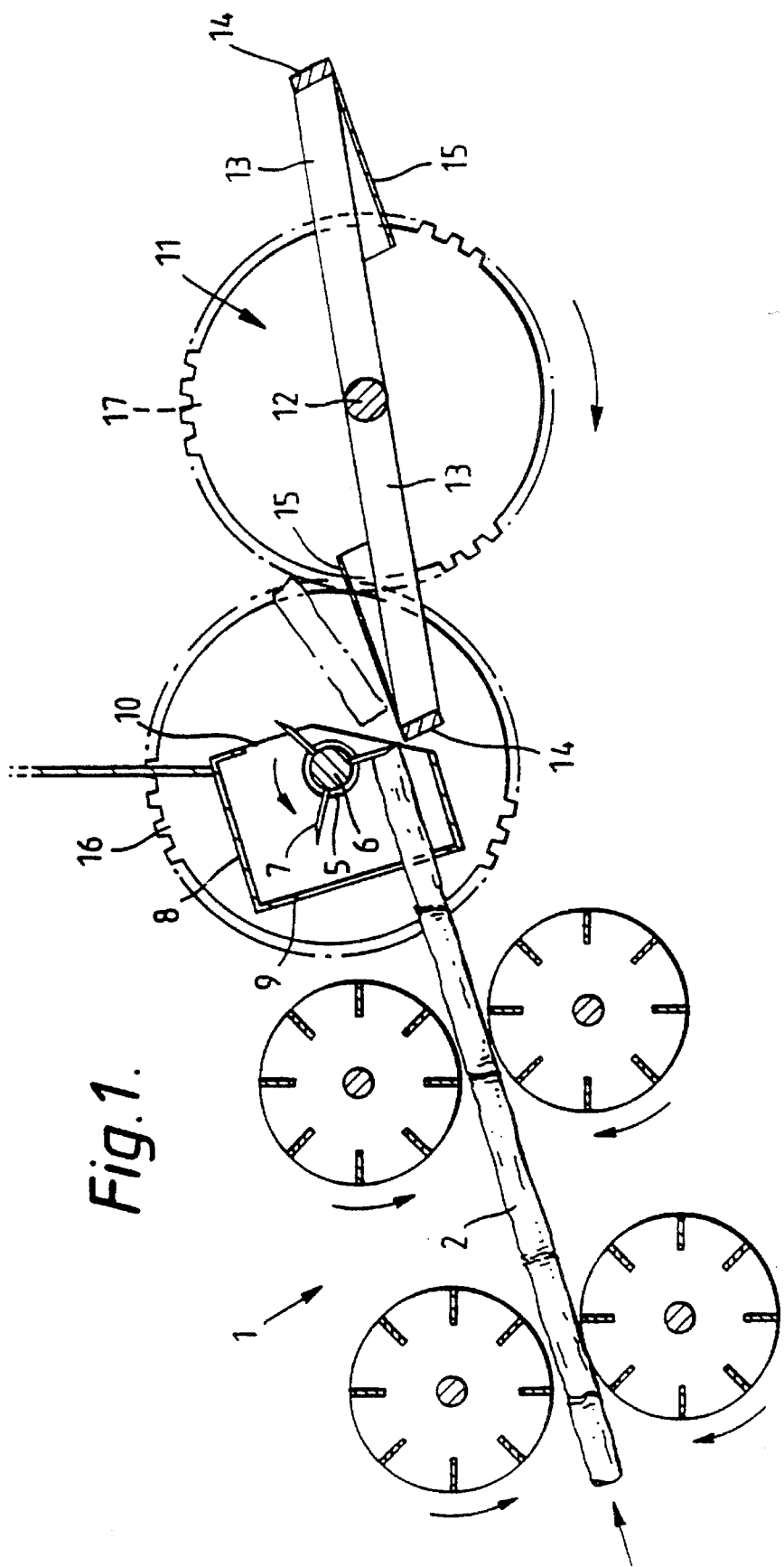
FIG. 1 shows schematically the configuration of the cutting apparatus for cane harvesters.

In FIG. 1, the cutting apparatus comprises a conveyor, shown generally at 1, which is adapted to feed cane stalks 2 lengthwise to the cutting apparatus shown generally at 3. The conveyor 1 comprises a series of upper and lower rollers 4 which counter-rotate to feed the cane stalks 2 into the cutter 3 at a predetermined rate.

A cutting rotor 5 rotates about an axis 6 transverse to the cane stalks 2 and includes three sharpened and/or serrated cutting blades 7 extending parallel to axis 6 and extending radially therefrom at equal spacings.

The cutting rotor 5 rotates within a housing 8 having a feed inlet opening 9 and a feed outlet opening 10.

A thrower 11 rotates about an axis 12 parallel to the rotational axis 6 of cutting rotor 5 and at the opposed ends of thrower arms 13 are hardened steel anvils 14 each having a sharpened edge which cooperate with the blades of rotary cutter 5 to sever the cane stalks into billets of predetermined length. Extending rearwardly from the cutting edge of anvils 14 are thrower blades 15 inclined relative to thrower arms 13. Thrower blades 15 may be fixed at a predetermined angle to control the direction in which a cane billet is thrown but preferably these thrower blades 15 may be angularly adjustable by any suitable means.

The thrower blades 15 travel at a much faster speed through the air than the cutter blades. The high speed thrower blades 15 are therefore able to throw the cut billets the required distance.

Cutting rotor 5 and thrower 11 are synchronised by coacting gears 16, 17 to ensure that as a blade 7 of rotor 5 is approached by the cutting edge of anvil 14, the relative movement between blade 7 and anvil 14 effects a clean guillotining shear of the cane stalks.

As can be seen in FIG. 1 the three bladed cutting rotor substantially restricts the ability of cane billets to be thrown back through outlet opening 10 in housing 8 thus substantially reducing wastage of harvested cane.

It will be readily apparent to a skilled addressee that cutting rotor 5 may include four or even five blades although three blades are preferred in practice. Similarly, the thrower 11 may include up to say four or five thrower arms with associated cutting anvils but in practice the three bladed cutter in combination with a three armed thrower illustrated in FIG. 2 is preferred.

Figure 2:
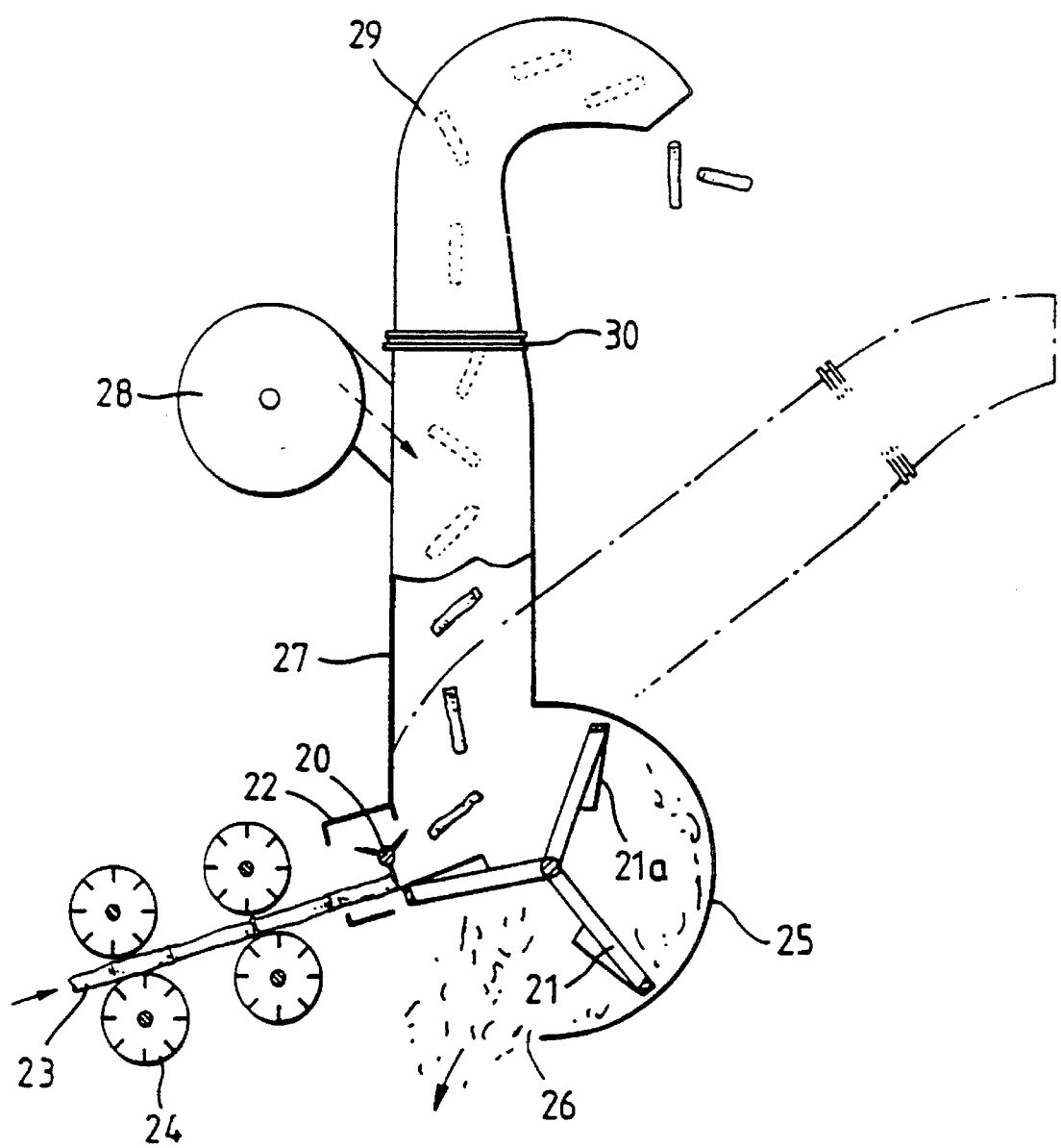
FIG. 2 shows schematically the combination of the cutting apparatus of the invention in association with a discharge chute and trash separation means.

In FIG. 2 there is illustrated a three bladed cutting rotor 20 in combination with a three armed thrower 21. The cutting rotor is located within a housing 22 as shown in FIG. 1 and cane stalks 23 are fed by conveyor rollers 24 also as shown in FIG. 1.

The thrower 21 is located within a ducted compartment 25 which has an opening 26 at its lower end through which cane trash is exhausted.

Associated with housing 25 is a discharge chute 7 through which cane billets are directed by the energy imparted by thrower blades 21a at the moment of being severed from the cane stalks 23. The severed billets are projected through a downwardly directed current of air from blower 28 and the cane trash, having a much lower mass and density is separated from the billets and is directed towards the opening communicating between discharge chute 27, and housing 25. As thrower 21 rotates within the close fitting peripheral wall portion of housing 25, it creates a partial vacuum or a region of reduced air pressure which assists in directing the separated air pressure which assists in directing the separated trash into the area swept by thrower blades 21a. The trash is thus swept through housing 25 to emerge at opening 26.

Advantageously, it has been found that when harvesting burnt cane as distinct from green cane, the volume and mass of trash to be separated from the cane billets is sufficiently less than that of green trash that operation of blower 28 is no longer required. This can give rise to an energy saving of up to about 50 horsepower in operational costs. The partial vacuum created by thrower 21 within housing 25 is sufficient to cause a downdraught of air to sweep the burnt cane trash into housing 25.

The curved outlet port 29 of discharge chute 27 is rotatably mounted on chute 27 by a flanged connection 30 to enable the cane billets to be discharged to either side of the cane harvester (not shown) or rearwardly thereof. The discharge chute shown enables direct discharge of cane billets into a transporter travelling beside or behind the cane harvester.

In an alternative embodiment the discharge chute may be inclined or selectively inclinable as shown in phantom. The discharge chute, whether upright or inclined may be used in conjunction with conventional hoppers and/or conveyor systems to facilitate alternative transporter loading.

Figure 3:
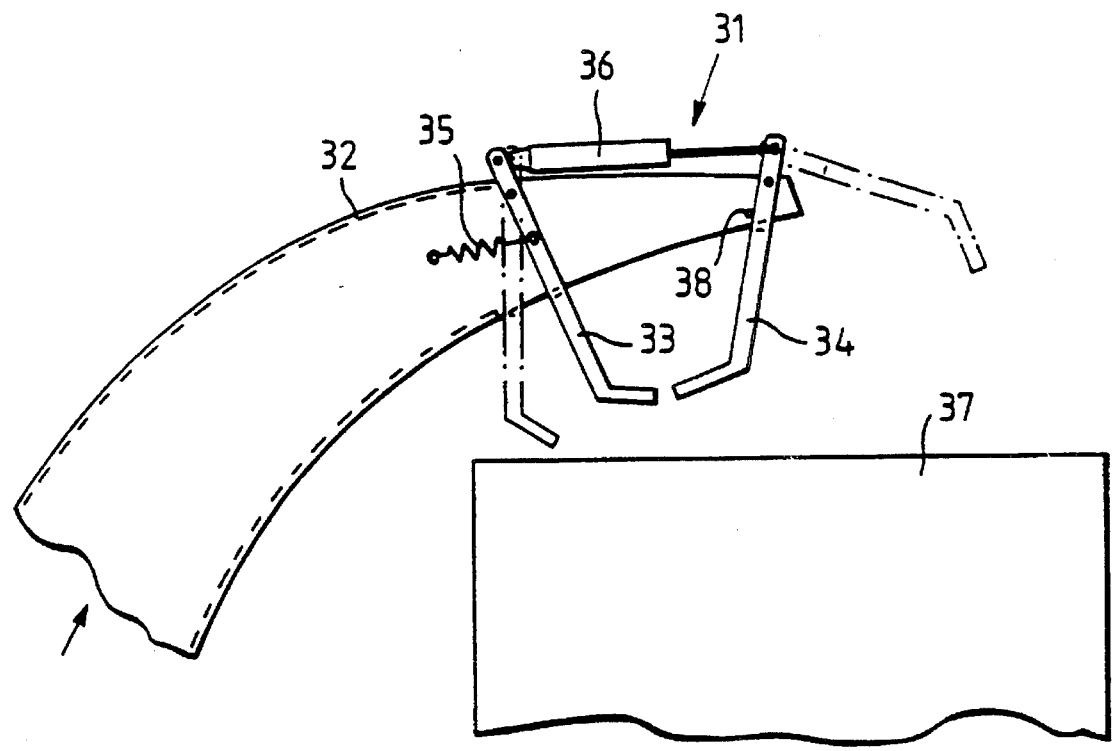
FIG. 3 shows a further aspect of the invention.

FIG. 3 shows a deflection guide/hopper apparatus 31 associated with the outlet port 32 of the discharge duct (not shown).

The deflection guide/hopper apparatus 31 comprises pivotal wall members 33, 34 movable between a fully extended position as shown in phantom and a fully retracted position as shown in bold outline, at which position wall members 33, 34 form a hopper to temporarily collect cane billets emerging from outlet port 32.

In operation as a deflection guide, wall 33 assumes a generally vertical position as shown in phantom under the influence of biassing spring 35. Hydraulic ram 36 is then selectively operated to move wall 34 between the positions shown in bold and phantom outline to direct cane billets into a desired position within transporter bin 37 travelling beside the harvester.

When the transporter bin 37 is full or otherwise when the harvester and transporter are necessarily separated at the end of a row of cane while the harvester turns around, hydraulic ram is actuated to cause arm 34 to pivot to the position shown in bold outline, at which position it engages a stop pin 38. Stop pin 38 prevents further movement of wall 34 and as ram 36 continues to be actuated the force of ram 36 overrides the biassing influence of spring 35 enabling wall 33 to move towards wall 34 to form a channel-like hopper enclosure as shown.

If required transverse walls 33, 34 may include end wall portions (not shown) to form an enclosed hopper in the retracted position.

The cutting apparatus according to the invention is particularly adapted for use with purpose built cane harvesters which possess a bin to receive cut billets of cane.

The cutting apparatus may also be fitted or retrofitted to cane harvesters of conventional configurations, with or without the deflection/hopper apparatus 31.

It will be readily apparent to a skilled addressee that many modifications or variations will be possible in accordance with the invention without departing from the spirit and scope thereof.

I claim:

1. A billet severing apparatus for cane harvesting machines, said apparatus comprising:

feed conveyor means to feed harvested cane stalks longitudinally at a predetermined rate to a severing region;

rotary cutter located in the severing region, said rotary cutter including a central cutter hub rotatable about its longitudinal axis, and a plurality of cutting blades extending radially from and longitudinally of the hub and spaced equally about the hub;

a rotatable thrower means adapted to counter-rotate relative to said rotary cutter about a substantially parallel rotational axis, said thrower means including a central thrower hub with at least two thrower blades extending radially from and longitudinally thereof and spaced equally about said thrower hub, said thrower blades including anvil means extending along radially outer edges of said of said thrower blades, said cutting blades and said anvil means cooperating in use to sever cane stalks into billets of predetermined length, characterised in that the cutter hub has at least three cutting blades.

2. A billet severing apparatus as claimed in claim 1 wherein said rotary cutter has three cutting blades.

3. A billet severing apparatus as claimed in claim 2 wherein the thrower means comprises three thrower blades.

4. A billet severing apparatus as claimed in claim 3 wherein the thrower blades are inclined relative to a plane extending radially from the thrower hub at the junction of the thrower hub and respective thrower blades.

5. A billet severing apparatus as claimed in claim 4 wherein the thrower means includes angular adjustment means to selectively vary the angle of inclination of the thrower blades relative to a respective plane extending radially from the thrower hub at the junction of the thrower hub and respective thrower blades.

6. A billet severing apparatus as claimed in claim 3, wherein the anvil means comprise a cutting edge extending along the radially outer edges of each thrower blade.

7. A billet severing apparatus as claimed in claim 6 wherein the thrower blades comprise an angularly adjustable anvil member.

8. A billet severing apparatus as claimed in claim 2 wherein the thrower means is located within a thrower housing with a close fitting peripheral wall surface extending about at least part of the swept volume of the thrower means.

9. A billet severing apparatus as claimed in claim 8 wherein the thrower housing and the thrower means cooperate in use to create a region of reduced air pressure within the swept volume of the thrower as the thrower means rotates.

10. A billet severing apparatus as claimed in claim 9 wherein the peripheral wall surface extends from about 90° to 180° of the circular path swept by the thrower means.

11. A billet severing apparatus as claimed in claim 8 including a discharge chute for cut cane billets, said discharge chute being associated with said thrower housing and angularly adjustable about an upright axis and/or a transverse axis.

12. A billet severing apparatus as claimed in claim 11 wherein the discharge chute includes a deflection means to selectively control the direction of emergence of cane billets from the discharge chute outlet port.

13. A billet severing apparatus as claimed in claim 11 wherein the discharge chute includes dischargeable hopper means to receive cane billets emerging therefrom.

14. A cane harvester comprising feed conveyor means to feed harvested cane stalks longitudinally at a predetermined rate to a severing region;

a rotary cutter located in the severing region, said rotary cutter including a central cutter hub rotatable about its longitudinal axis, and a plurality of cutting blades extending radially from and longitudinally of the hub and spaced equally about the hub;

a rotatable thrower means adapted to counter-rotate relative to said rotary cutter about a substantially parallel rotational axis, said thrower means including a central thrower hub with at least two thrower blades extending radially from and longitudinally thereof and spaced equally about said thrower hub, said thrower blades including anvil means extending along radially outer edges of said of said thrower blades, said cutting blades and said anvil means cooperating in use to sever cane stalks into billets of predetermined length, characterised in that the cutter hub has at least three cutting blades.

15. A cane harvester as claimed in claim 14 wherein the rotary cutter has three cutting blades.

\* \* \* \* \*